United States Patent [19]

McGrath

[11] 4,198,799
[45] Apr. 22, 1980

[54] APPARATUS FOR MAKING EXPLODED CELLULOSIC FIBER INSULATION

[75] Inventor: Spencer C. McGrath, Vancouver, Wash.

[73] Assignee: Cel-Cor Industries, Inc., Portland, Oreg.

[21] Appl. No.: 885,682

[22] Filed: Mar. 13, 1978

[51] Int. Cl.² .......................................... B02C 13/238
[52] U.S. Cl. ...................................... 53/121; 118/35;
241/43; 241/60; 241/73; 241/76; 241/79.1;
241/101 D; 241/152 A
[58] Field of Search ............... 241/79.1, 101.5, 101.6,
241/101 A, 101 B, 101 D, 152 R, 152 A, 43, 45,
76, 77, 78, 60, 61, 62, 86.1, 73, DIG. 38, 29, 24;
118/35; 427/213, 214; 53/121

[56] References Cited

U.S. PATENT DOCUMENTS

| 2,639,096 | 5/1953 | Hinerfeld | 241/79.1 X |
| 3,184,170 | 5/1965 | Keresztesy | 241/73 |
| 3,876,157 | 4/1975 | McIntire et al. | 241/DIG. 38 |
| 3,981,454 | 9/1976 | Williams | 241/79.1 X |

*Primary Examiner*—Mark Rosenbaum
*Attorney, Agent, or Firm*—Chernoff & Vilhauer

[57] ABSTRACT

Apparatus for making fiber insulation from paper comprises a preshredder having a semi-cylindrical perforate basket with a passageway behind it. An air inlet extends behind the basket into the passageway and an air outlet is located at the front of the passageway. A flail rotatably mounted coaxial in the basket is driven by a motor for shredding paper deposited from a conveyor into the basket. A blower, connected to the preshredder, passes the paper segments to a surge bin where the air and paper segments are separated. The separated paper segments accumulate in the surge bin and are withdrawn from it at a constant predetermined rate by a conveyor and deposited into a duct which interconnects the surge bin and a finishing mill. The air then enters this duct to continue transporting the paper. A dry chemical dispensing device disperses flame retardant material into the duct. The finishing mill includes a large centrifugal fan rotatably mounted in a cylindrical cavity and driven by a motor. The cavity is covered by a perforate plate so that paper segments drawn centrally into the fan are ejected radially from its blades and exploded through the cover to form fiber insulation. The insulation is deposited into another surge bin for separation from the air and accumulation for bagging. The air passes through an air cleaner and is exhausted from the device. Accordingly, the air remains within the apparatus through the entire procedure thereby reducing dust and noise heretofore associated with such apparatus.

14 Claims, 10 Drawing Figures

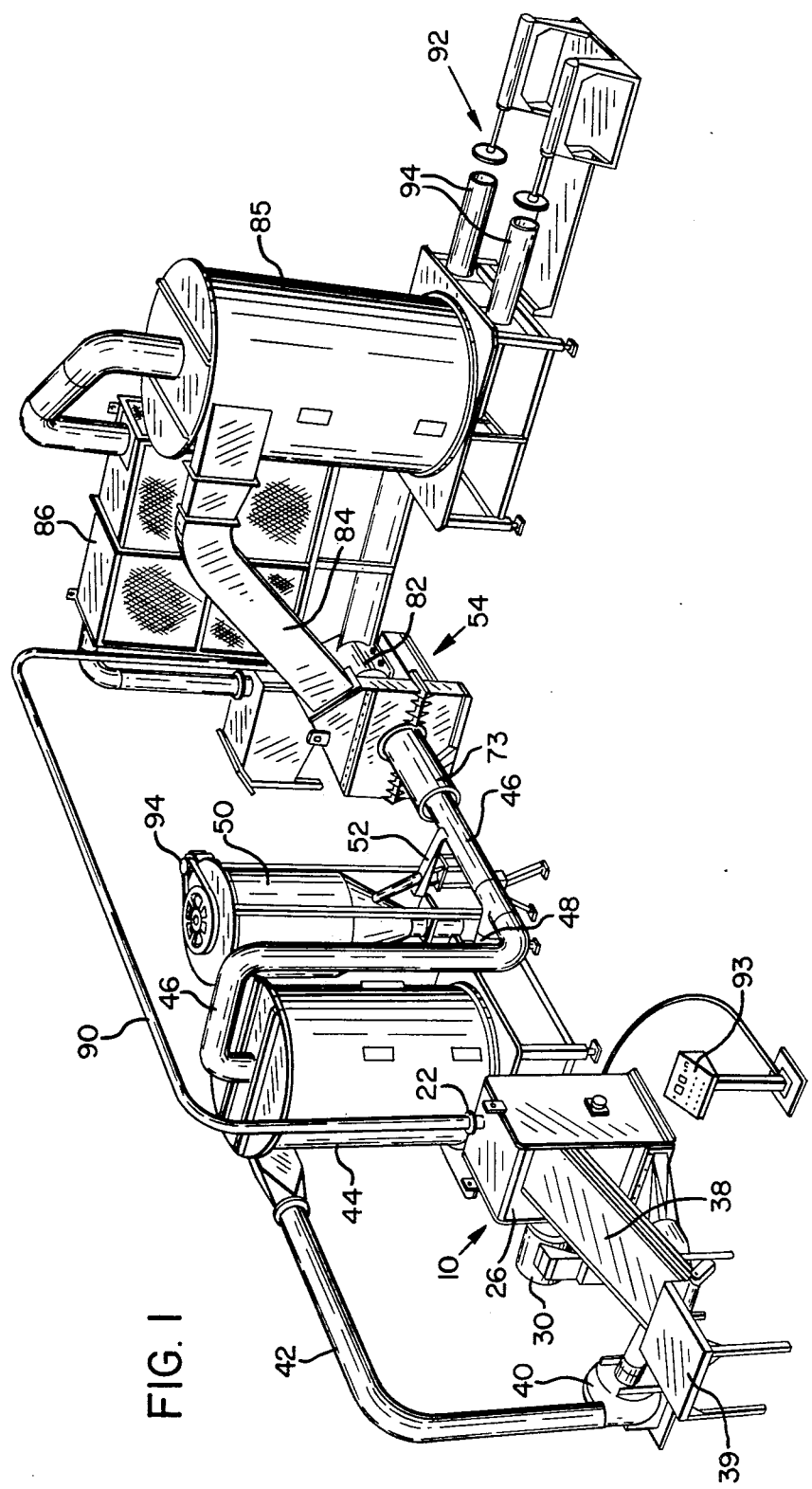
FIG. I

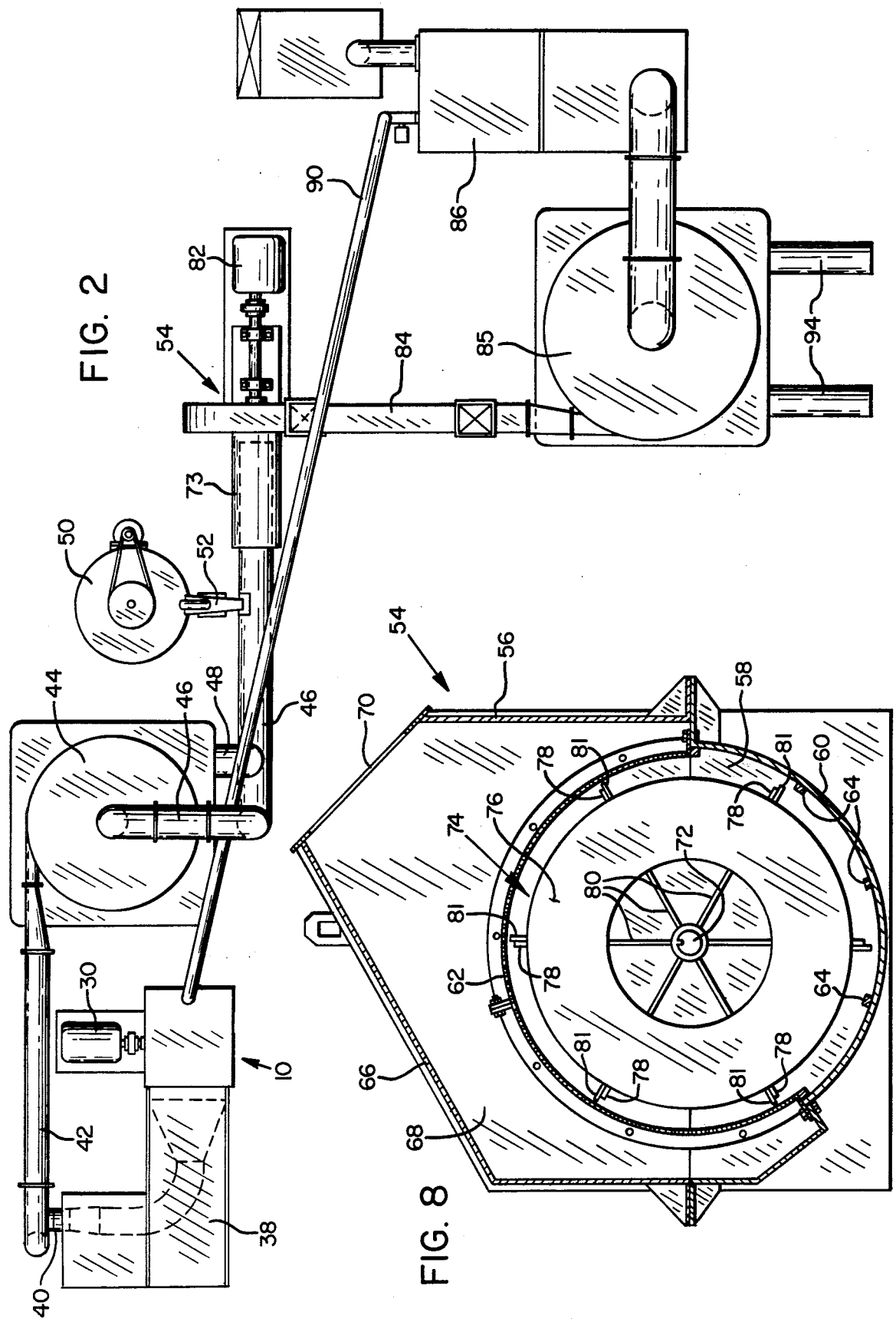

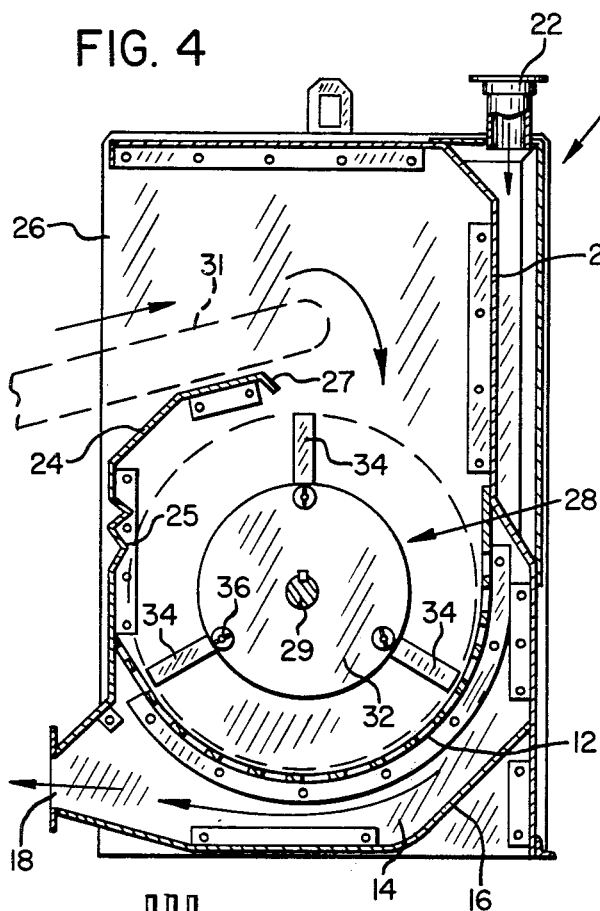
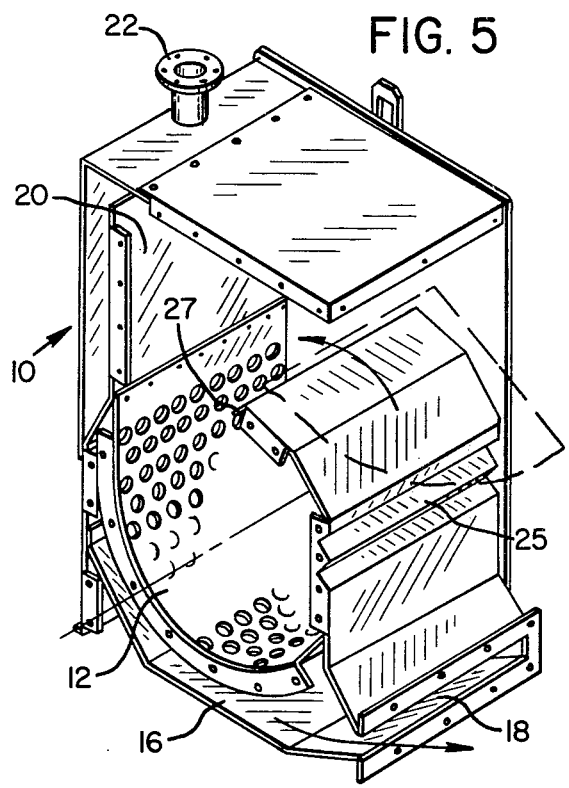
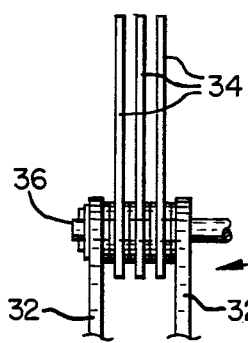
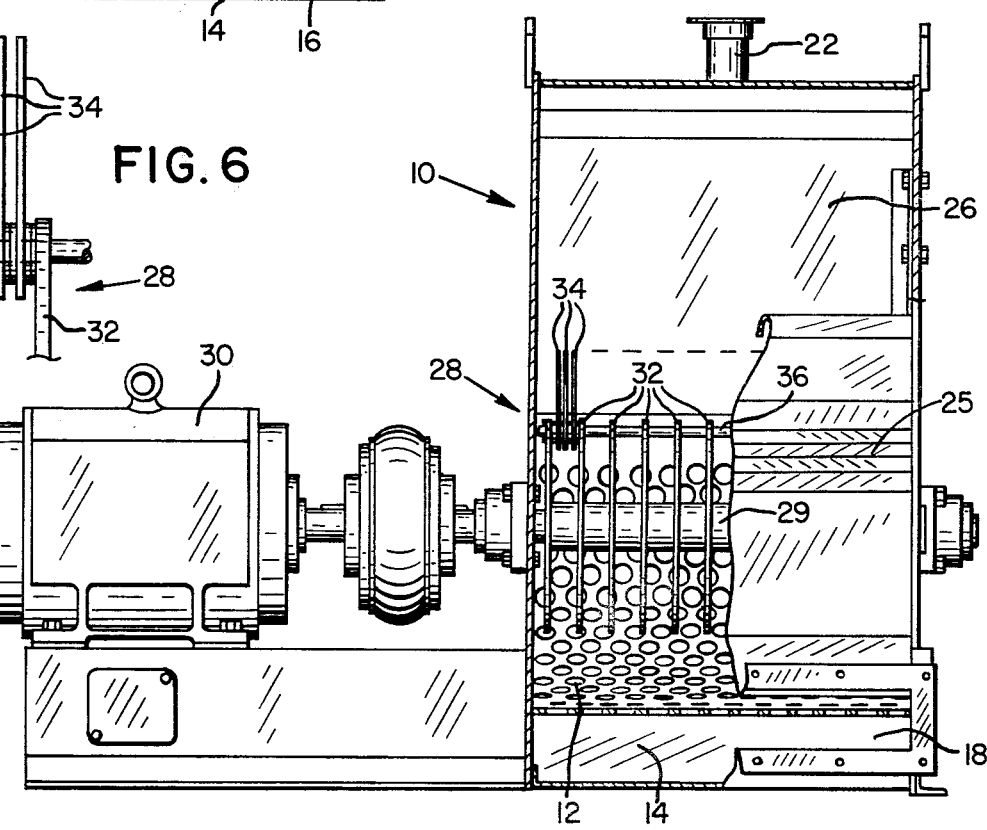

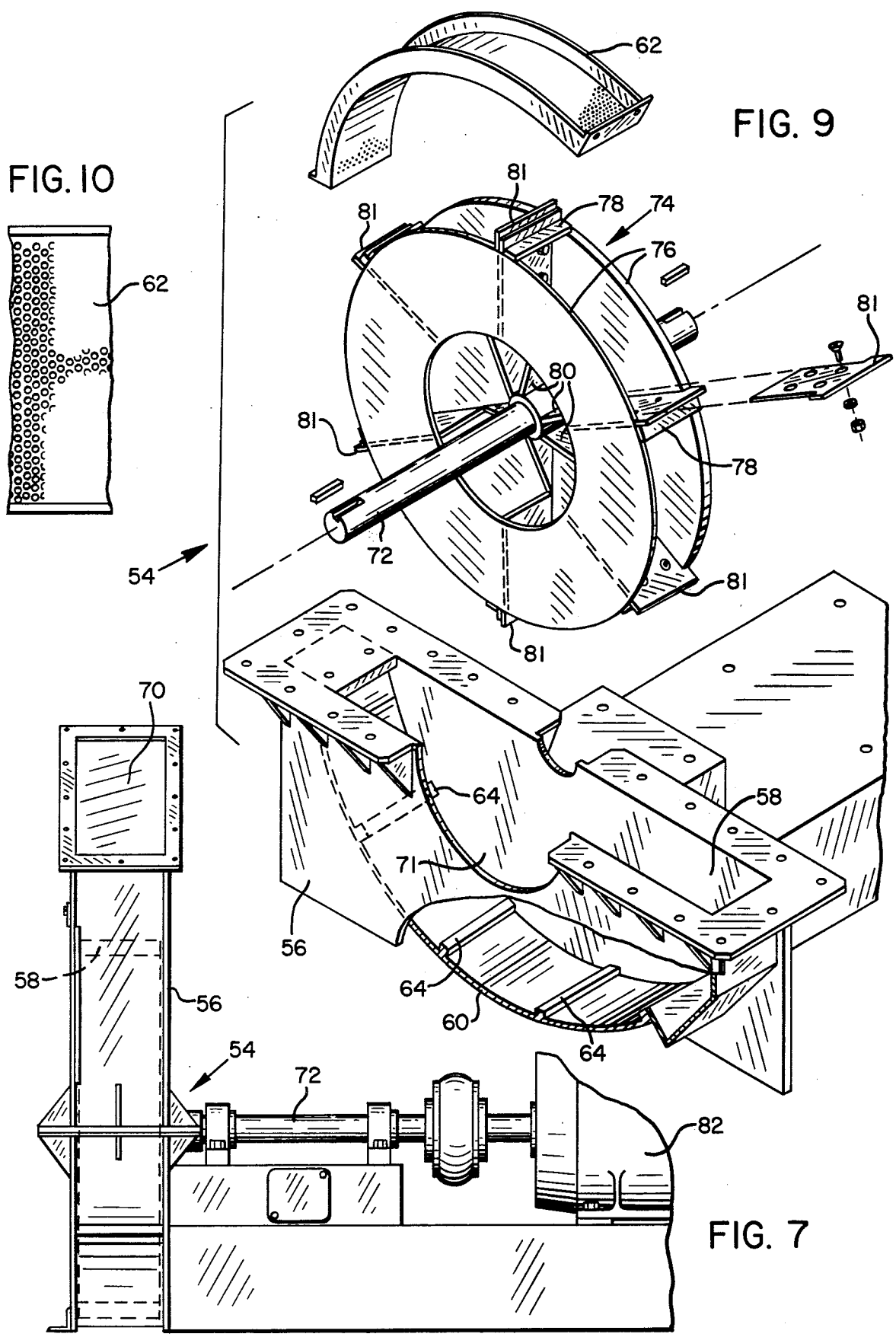

APPARATUS FOR MAKING EXPLODED CELLULOSIC FIBER INSULATION

BACKGROUND OF THE INVENTION

This invention relates to an apparatus for making exploded fiber insulation from paper.

The process of making cellulosic fiber insulation by directing shredded paper segments which are entrained in a high velocity stream of air at a screen or perforate plate has become commercially desirable in the insulation industry. However, the prior art apparatus which are used for performing this process have undesirable shortcomings.

Since pressurized air is used in the process to transport the material from one element of the apparatus to another, a considerable amount of noise is created due to the repeated exhausting of this air at each step. In addition, the exhausted air necessarily is quite dirty and if it is not cleaned before being exhausted it causes a considerable health hazard. Therefore, in order to maintain a tolerable environment around the apparatus, air cleaners and mufflers should be installed downstream of each of its elements. However, since several elements are required in the process there is a large cost disadvantage associated with cleaning and muffling the air which is dumped from each element, and accordingly the air which is exhausted from some of the elements normally is untreated.

In addition, some of the elements used in prior art apparatus of this class are inefficient in operation. For example, the prior art preshredders do not effectively evacuate the shredded paper, and as a result the paper tends to accumulate and thus partially restrict the basket through which it passes. Furthermore, the prior art preshredders do not provide means for recycling partilly shredded paper back up onto the flail, therefore, resulting in a buildup of the partially shredded material in the basket which also causes it to become restricted.

In addition, the finishing mills used in the prior art apparatus generally are of a design which does not provide maximum efficiency in exploding the shredded paper into fiber insulation.

SUMMARY OF THE INVENTION

The apparatus of the present invention includes a preshredder which shreds the paper into randomly sized paper segments prior to its being transported through the remainder of the apparatus. The preshredder includes a housing having a semi-cylindrical perforate basket located transversely between its sides, with that portion of the basket facing towards the top of the housing being open. Located behind and below the basket is a passageway into which the shredded paper is evacuated from the preshredder after it drops through the opening in the perforate basket. At the front of the passageway is an outlet which opens out of the housing and at the top and rear of the passageway is a duct arranged for admitting pressurized air into the passageway in order to keep it fully evacuated.

A flail is rotatably mounted coaxially in the basket for shredding the paper which is admitted into the housing through an opening located near its top and front. A guide plate, having 2 inwardly facing lips located on it, is located adjacent to the front edge of the basket and extends upwardly and inwardly over the top of the flail in order that any paper which is not fully shredded by the flail will be directed back upwardly onto it again.

The shredded paper is evacuated from the preshredder by a blower which transports it through a duct to the top of a surge bin where a cyclone separator separates the air from the paper and deposits the shredded paper into the bottom of the surge bin. As the shredded paper is accumulated in the surge bin, a metered amount of it is removed through a conveyor which enters a pipe that is connected to the surge bin in a manner to receive the separated air from the blower.

Located downstream of the conveyor is a dry chemical dispenser which injects a metered amount of flame retardant material into the pipe along with the shredded paper. The air entrained shredded paper and chemical then is directed into a finishing mill where it is exploded into fiber insulation.

The finishing mill includes a housing, having a cylindrical cavity located in it which is arranged to receive a rotatable centrifugal fan. The top and rear of the cavity are defined by a perforate cover and a passageway is located above the perforate cover, with an exit from the passageway being located at the upper front portion of the housing. Accordingly, as the shredded paper is directed into the finishing mill centrally of the fan, it is accelerated to a high velocity and directed outwardly toward the perforate cover. As the high speed paper segments strike the cover and pass through it, they are exploded into fiber insulation material which is then blown out of the opening. A plurality of trip bars are located transversely across the bottom of the cavity at spaced intervals in order to prevent accumulation of material. A duct connects the outlet of the finishing mill to a second surge bin which is used to separate the air from the fiber insulation material which then is accumulated in the bottom of the bin.

The fiber insulation is transported out of the bottom of the surge bin on a conveyor to a bagger which is used to package it. The separated air then is passed through an air cleaner to remove any impurities and it is exhausted. A portion of the cleaned air is passed through tubing to the duct in the back of the preshredder.

Therefore, the air from the blower, which is used to transport the materials through the apparatus, is contained within the apparatus entirely from the start to the finish of the process so that it only needs to be cleaned and exhausted at one location.

Accordingly, it is a principal objective of the present invention to provide an apparatus of the above-described class which is quiet and clean in operation.

It is a further object of the present invention to provide such an apparatus having a preshredder which is of unique design for efficient operation.

It is a further object of the present invention to provide such an apparatus having a finishing mill which explodes a large amount of fiber insulation in a uniform manner.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a perspective view showing a preferred embodiment of the apparatus of the present invention.

FIG. 2 is a plan view of the apparatus of FIG. 1.

FIG. 3 is a front elevation view, partially broken away, of a preshredder which is an element of the invention.

FIG. 4 is a side sectional view of the preshredder of FIG. 3.

FIG. 5 is a perspective view of the preshredder of FIG. 3.

FIG. 6 is a detailed view, at an enlarged scale, of the flails used in the preshredder.

FIG. 7 is a front elevating view of a finishing mill which is an element of the invention FIG. 8 is a side sectional view of the finishing mill of FIG. 7.

FIG. 9 is a partial exploded view of the finishing mill of FIG. 7.

FIG. 10 is a detailed view of a cover used in the finishing mill of FIG. 7.

DETAILED DESCRIPTION OF THE INVENTION

Referring to FIGS. 1 and 2 of the drawings, the apparatus of the present invention is comprised of a series of individual devices which are interconnected in a manner for processing raw paper into fiber insulation. As will be more fully explained later, the paper is entrained in an airstream for transportation through the apparatus and the air is contained in the apparatus from the start of the process to its finish.

The first element of the apparatus is a preshredder 10, FIGS. 3, 4 and 5 which shreds the paper into randomly sized segments. It comprises a semicylindrical perforate basket 12 which extends between the sides of the lower portion of the housing, and preferably extends peripherally from about 10–20 degrees below its horizontal center line at the front of the housing to about 10–20 degrees above its horizontal center line at the rear of the housing.

The basket is offset from the housing to form a passageway 14 between it and the bottom and back of the housing, and the bottom 16 of the housing is arcuate so as to contour the passageway. The passageway opens out of the front of the housing to form an outlet 18 and it is continued up the back of the housing, by means of an inner wall 20, to where it opens to a duct 22.

Extending upwardly from the front of the basket is a guide plate 24, which is angled inwardly at its upper end to form a partial upper surface to the otherwise open topped basket. A triangular shaped lip 25 is located medially on the guide plate and a flat lip 27 is located at the exit of the guide plate to deflect the paper inwardly and prevent it from spinning unimpeded therein. An inlet 26 is located in the front of the housing above the guide plate for admitting paper into the preshredder.

Rotatably mounted in basket 12 is a flail 28 comprising a central shaft 29 which is driven by a motor 30. Planar discs 32 are mounted on the shaft at spaced intervals and a plurality of blades 34 are pivotally mounted at circumferentially spaced locations between each pair of discs 32 by means of rods 36. The flail is configured so that when the blades are straightened by centrifugal force upon rotation of shaft 29 their extremities nearly contact basket 12.

A conveyor 38 travels from a loading table 39, which is positioned in front of the preshredder, up into inlet 26 above flail 28. Therefore, paper admitted into the preshredder is deposited directly onto the flail.

Outlet 18 of the preshredder is connected to a blower 40, which evacuates the shredded paper from passageway 14. Blower 40 exhausts into a duct 42 which is interconnected to the upper end of a surge bin 44. The surge bin comprises a cylindrical tank and has a cyclonic separator at its upper end which separates the shredded paper particles from the air and deposits them into the surge bin where they can be accumulated to ensure their being available in sufficient quantity so that a metered amount of them can be supplied to the remainder of the apparatus.

A pipe 46, connected to the top of surge bin 44, collects the air after the paper particles have been separated from it and directs it to the bottom of the surge bin where a measured amount of the particles are again entrained in it for transport to the rest of the apparatus. To accomplish this a conveyor 48 interconnects with bottom of the surge bin and duct 46. A dry chemical dispenser 50 has feed means 52 which enter duct 46 downstream of conveyor 48. Accordingly, a fire retardant chemical can be added to the air and entrained paper particles in a measured quantity which is proportional to the amount of paper being fed into the duct from conveyor 48.

The air, paper segments and chemical then are directed to a finishing mill 54, FIGS. 7, 8 and 9, where the paper segments are exploded into fiber insulation. The finishing mill comprises a thin housing 56 which has a cylindrical cavity 58 located therein. The bottom wall 60 of the cavity is solid and the top wall is comprised of a removable perforate cover 62, which extends peripherally from 10–20 degrees below the horizontal center line of the cavity at the rear of the housing, and which is offset slightly inwardly with respect to bottom wall 60. Located at spaced intervals transversely across bottom wall 60 are rectangularly cross sectioned trip bars 64.

The top wall 66 of the housing is angled upwardly toward its front to form a passageway 68 between cover 62 and the housing, and the upper front corner of the housing is opened into the passageway to form an outlet 70. Located in the housing centrally of the cavity is a circular cutout 71 which is attached to a cylindrical venturi tube 73 through which duct 46 enters the finishing mill.

Mounted rotatably within the cavity on a shaft 72 is a centrifugal fan 74 which has paired circular side plates 76 which are located adjacent to the sides of the housing, and a plurality of radial blades 78 which span between the side plates. The center of one of the side plates is open in alignment with cutout 71 and the fan is joined to shaft 72 by means of webs 80. Releaseably joined to each blade 78 is a blade liner 81 which extends outwardly to near proximity with trip bar 64 and cover 62. The fan is driven by means of a motor 82.

A duct 84 interconnects outlet 70 of the finishing mill and a second surge bin 85 which is similar to surge bin 44. The air which is separated from the fiber insulation in the separator of this surge bin is passed to an air cleaner 86 where it is cleaned of any remaining paper segments, fiber insulation or chemical, and the cleaned air then is exhausted. A portion of the cleaned air is channeled through a pipe 90 from the air cleaner to duct 22 of the preshredder.

A bagger 92 is attached to the output conveyors 94 of surge bin 85 for bagging the fiber insulation material which is accumulated therein.

OPERATION

The various elements of the apparatus are operated by appropriate controls which are located on a panel 93. Prior to introducing paper into the apparatus, motors 30 and 82 and blower 40 are activated along with conveyors 38, 48, and 92. In addition, agitator 94 on dry chemical dispenser 50 is activated.

Paper (not shown) is then placed on conveyor 38 where it is passed into inlet 26 of preshredder 10 and deposited on top of flail 28. Since blower 40 evacuates the preshredder, the paper is rapidly drawn inwardly and downwardly through the inlet onto the flail.

As the paper is deposited on the flail, blades 34, which are extended due to centrifugal force, strike the paper thereby shredding it into randomly sized paper segments which fall downwardly onto basket 12. Those segments which are small enough to pass through the openings in the basket drop into passageway 14 where they are evacuated through outlet 18 due to the suction of blower 40. It will be noted that the placement of outlet 18 in the front of the passageway allows the natural air flow generated by the flail to direct the paper segments out of the preshredder so that a less powerful blower is required. The pressurized air entering duct 22 into the passageway scrubs the outer wall of the basket to keep it free for passage of paper as well as aiding in the evacuation of the passageway. Also, due to the fact that the basket extends upwardly above the horizontal center line in the back and is separated from the wall of the preshredder by the passageway, the critical top portion of the basket, where most of the paper strikes, remains open to pass the paper thereby increasing the efficiency of the preshredder.

Any paper which is insufficiently shredded to pass through basket 14 is driven around it and then upwardly on guide plate 24 by blades 34. Due to the shape of the guide plate and its close proximity to flail 28 the partially shredded paper is continuously moved upwardly where it is, due to the action of lips 25 and 27, deposited back on top of the flail along with new paper. Accordingly, there is no buildup of partially shredded paper on the inner basket wall, and the basket remains free for passage of the paper segments. Likewise the paper is not allowed to spin along with the flail without being struck by the blades.

As the paper segments are evacuated by blower 40, they are transmitted in duct 42 to surge bin 44. There the paper segments are separated from the air and dropped into the bottom of the surge bin where they are metered out of the bottom of the surge bin by conveyor 48. However, due to the accumulation of the segments in the surge bin, the feed rate achieved by conveyor 48 is relatively constant rather than fluctuating as the output of the shredder necessarily is.

Conveyor 48 deposits the paper segments into duct 46 which carries the separated air from the surge bin. Downstream of conveyor 48 dry chemical (not shown) is injected into the entrained paper segments from chemical dispenser 50 through feed means 52. The entrained paper segments and chemical then are emptied into finishing mill 54.

Up to this point the paper segments are transported entirely by the air from blower 40. However, in the vicinity of the finishing mill the rotation of fan 74 creates a vacuum which induces additional airflow into the finishing mill through venturi 73. Accordingly, the paper segments are accelerated until they are traveling at a high rate of speed as they leave the end of fan blades 81, allowing them to be exploded through cover 62 and thereby effectively transformed into fiber insulation. Likewise, the dry chemical which is intermixed with the paper segments is exploded along with the paper segments and is impregnated therein.

Referring in particular to FIG. 8, the high paper velocity created by the unique design and high rotational speed of the fan in cooperation with the large peripheral extent of cover 62 allow efficiently forming a large quantity of insulation which then is effectively evacuated from housing 56 through outlet 70. As will be noted, outlet 70 is oriented to coincide with the natural path of the insulation as it passes from the fan.

The insulation is blown through duct 84 into surge bin 85 where it is accumulated and then bagged by means of baggers 92. The air which is separated from the insulation is cleaned by passing it through air cleaner 86 and then it is exhausted.

It would be noted that the air used to transport the material is contained within the apparatus over its entire extent, thereby requiring only a single cleaning operation and reducing the amount of dust and noise normally associated with equipment of this type.

The terms and expressions which have been employed in the foregoing abstract and specifications are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for making exploded fiber insulation from paper comprises:
    (a) preshredder means for shredding the paper into randomly sized paper segments;
    (b) a blower connected to said preshredder means and arranged to evacuate said paper segments from said preshredder and to distribute them intermixed with air;
    (c) a surge bin connected to said blower arranged to receive said paper segments and air, including separator means for separating said paper segments from said air and allowing them to accumulate in said surge bin;
    (d) conveyor means associated with said surge bin for delivering a measured amount of said paper segments therefrom;
    (e) a duct connected at one end to said surge bin in a manner for receiving said air, and having means for entraining said shredded paper from said conveyor means into said air;
    (f) chemical dispensing means interconnected to said duct downstream of said surge bin for dispensing a measured amount of a flame retardant material into said entrained air and shredded paper; and
    (g) finishing mill means connected to the other end of said duct for exploding said shredded paper and dry chemical into fire retardant fiber insulation, having an outlet for passing said insulation and said air therefrom;
    (h) wherein said air from said blower is continuously contained in said apparatus until it exits from said finishing mill.

2. The apparatus of claim 1 including a second surge bin connected to said finishing mill in a manner for receiving said fiber insulation and air, including separator means for separating said fiber insulation from said air, and allowing it to accumulate in said second surge bin.

3. The apparatus of claim 2 including feed means associated with said second surge bin for delivering a measured amount of said fiber insulation therefrom, and a bagger connected to said feed means for bagging said fiber insulation.

4. The apparatus of claim 2 including an air outlet connected to said second surge bin in a manner for receiving said air, and an air cleaner associated with said air outlet to remove any shredded paper, fire retardant material, or fiber insulation from said air.

5. The apparatus of claim 1 wherein said preshredder comprises:
 (a) a housing having a front, a back, paired sides, a top and a bottom;
 (b) a semi-cylindrical perforate basket located in said housing extending transversely between said sides, the portion of said basket facing towards said top being open, and said basket defining a passageway between said back and bottom of said housing;
 (c) flail means rotatably mounted coaxially in said basket for shredding paper which is deposited in said basket into paper segments;
 (d) drive means for rotatably driving said flail means;
 (e) an inlet in said front of said housing arranged to admit said paper into said housing above said flail means;
 (f) duct means located in said housing for admitting pressurized air from outside said housing into said passageway; and
 (g) an outlet in said front of said housing, located below said flail means and exiting from said passageway for discharging said paper segments.

6. The apparatus of claim 5 wherein the preshredder further includes a guide plate located adjacent to the front of said housing, immediately above said basket and arranged for depositing unshredded paper back above said flail.

7. The apparatus of claim 6 including a first lip located medially on said guide plate and a second lip located at the extremity of said guide plate to direct said unshredded paper inwardly toward said flail.

8. The apparatus of claim 5 wherein said basket extends circumferentially from approximately 10-20 degrees above a horizontal plane extending through an axis about which said flail is rotatable at the back of said housing, to approximately 10-20 degrees below said plane at the front of said housing.

9. The apparatus of claim 5 wherein said duct means comprises a channel located adjacent to said back of said housing and an inlet pipe entering said channel at said top of said housing.

10. The apparatus of claim 1 wherein the finishing mill comprises:
 (a) a housing having a front, a back and a top, said housing having a cylindrical cavity located therein;
 (b) a perforate cover defining a portion of the periphery of said cavity;
 (c) a passageway located in said housing adjacent to said cover and having an outlet opening from said housing;
 (d) a fan rotatably mounted within said cavity having a hollow core, and a plurality of fan blades extending radially from said core approximately to the periphery of said cavity; and
 (e) an inlet in said housing opening into said core of said fan.

11. The apparatus of claim 10 wherein said cover extends circumferentially from approximately 10-20 degrees below a horizontal plane which extends through an axis about which said fan is rotatable at the back of said housing, to near said plane at the front of said housing.

12. The apparatus of claim 10 wherein the outlet is located in the front of said housing proximate its top.

13. The apparatus of claim 10 including trip bars located transversely across said cavity at spaced intervals opposite said cover.

14. The apparatus of claim 10 including liners which are removably attached to said fan blades.

* * * * *